US011383304B2

(12) United States Patent
Jeong

(10) Patent No.: US 11,383,304 B2
(45) Date of Patent: Jul. 12, 2022

(54) COOLING SYSTEMS FOR PRINT HEADS

(71) Applicant: HEWLETT-PACKARD DEVELOPMENT COMPANY, L.P., Spring, TX (US)

(72) Inventor: Samuel Jeong, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 985 days.

(21) Appl. No.: 16/075,630

(22) PCT Filed: Jul. 28, 2017

(86) PCT No.: PCT/US2017/044372
§ 371 (c)(1),
(2) Date: Aug. 4, 2018

(87) PCT Pub. No.: WO2019/022764
PCT Pub. Date: Jan. 31, 2019

(65) Prior Publication Data
US 2021/0205891 A1 Jul. 8, 2021

(51) Int. Cl.
*B22F 12/20* (2021.01)
*B29C 64/153* (2017.01)
*B29C 64/209* (2017.01)
*B22F 12/53* (2021.01)
*B33Y 30/00* (2015.01)
*B33Y 40/00* (2020.01)

(52) U.S. Cl.
CPC .............. *B22F 12/20* (2021.01); *B22F 12/53* (2021.01); *B29C 64/153* (2017.08); *B29C 64/209* (2017.08); *B33Y 30/00* (2014.12); *B33Y 40/00* (2014.12)

(58) Field of Classification Search
CPC ...... B29C 64/153; B29C 64/209; B33Y 30/00
See application file for complete search history.

(56) References Cited

U.S. PATENT DOCUMENTS

2003/0197752 A1* 10/2003 McEltresh ........... B41J 2/04526
347/21
2009/0314391 A1 12/2009 Crump et al.
(Continued)

FOREIGN PATENT DOCUMENTS

| CN | 203371791 U | 1/2014 |
| CN | 104786510 A | 7/2015 |
| CN | 204488059 U | 7/2015 |

OTHER PUBLICATIONS

"Print Cooling Fan System for MakerFarm Prusa i3 and i3v". Retrieved from Internet: https://www.thingiverse.com/make:150019, Jul. 25, 2015, 2 pages.

*Primary Examiner* — Joseph S Del Sole
*Assistant Examiner* — Mohamed K Ahmed Ali
(74) *Attorney, Agent, or Firm* — Conley Rose PC

(57) ABSTRACT

In some examples, an electronic device includes a print head to move relative to a platform parallel to a first axis and parallel to a second axis to deliver a print agent to the platform. The second axis is oriented at a non-zero angle relative to the first axis. In addition, the electronic device includes a cooling system having a first air duct coupled to the print head to provide air to the print head. The print head is to move with the first air duct parallel to the first axis, and to move relative to the first air duct parallel to the second axis.

15 Claims, 6 Drawing Sheets

(56) References Cited

U.S. PATENT DOCUMENTS

| | | |
|---|---|---|
| 2011/0109693 A1* | 5/2011 | Ohnishi .................. B41J 29/02 347/34 |
| 2015/0165676 A1 | 6/2015 | Chen et al. |
| 2016/0031159 A1 | 2/2016 | Church et al. |
| 2016/0121399 A1 | 5/2016 | Buller et al. |
| 2016/0297110 A1 | 10/2016 | Wu |
| 2016/0332375 A1* | 11/2016 | Juan ..................... B29C 64/165 |
| 2017/0106590 A1* | 4/2017 | Hakkaku ................ B29C 64/40 |

* cited by examiner

COOLING SYSTEMS FOR PRINT HEADS

BACKGROUND

Electronic devices may include cooling systems to maintain a desired operation temperature. A cooling system may include passive devices, such as a finned heat exchanger, or may include active devices, such as a fan. The cooling specifications for an electronic device establish the types and capacities of the cooling devices used in the cooling system.

BRIEF DESCRIPTION OF THE DRAWINGS

Various examples are described below referring to the following figures.

DETAILED DESCRIPTION

Figure 1:
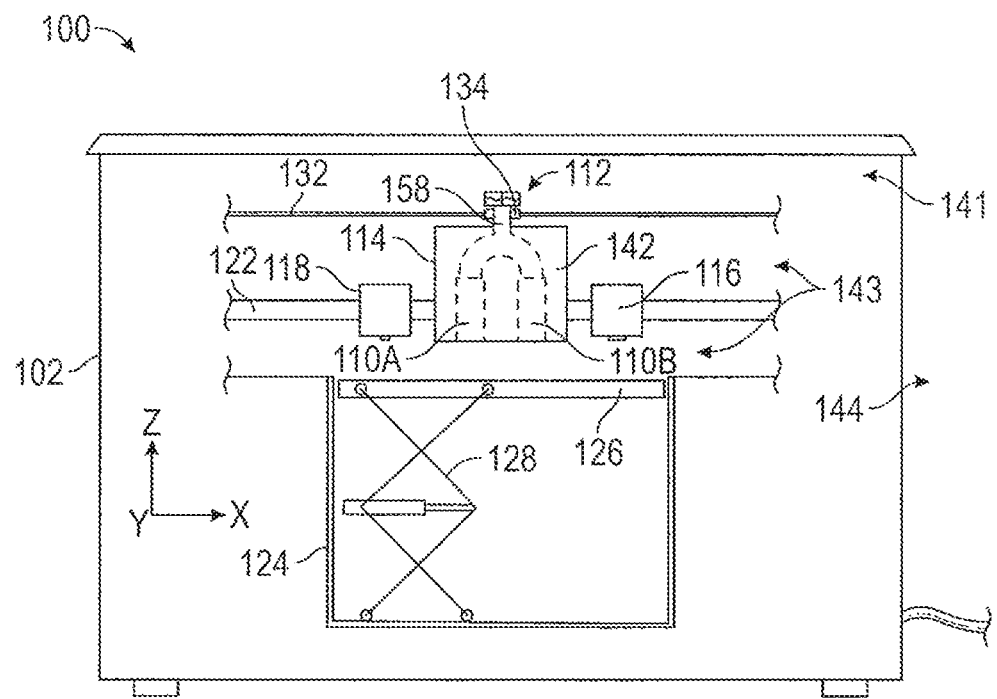
FIG. 1 shows a front schematic view of an electronic device having a cooling system in accordance with various examples.

In the following discussion and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. In addition, as used herein, the terms "axial" and "axially" generally refer to positions along or parallel to a central or longitudinal axis (e.g., central axis of a body or a port), while the terms "lateral" and "laterally" generally refer to positions located or spaced to the side of the central or longitudinal axis.

As used herein, including in the claims, the word "or" is used in an inclusive manner. For example, "A or B" means any of the following: "A" alone, "B" alone, or both "A" and "B." The word "or" is used in an inclusive manner. For example, "A or B" means any of the following: "A" alone, "B" alone, or both "A" and "B." In addition, when used herein including the claims, the word "generally" or "substantially" means within a range of plus or minus 20% of the stated value.

This disclosure describes systems and methods for cooling electronic devices and may be particularly applicable to cooling moving parts within electronic devices. For example, the examples disclosed herein are suitable for cooling the print head and associated nozzle(s) of three-dimensional (3D) printers.

In an example, a 3D printer with cooling includes a material feed mechanism, a printer head that has one nozzle or multiple nozzles, a cooling system with an air duct assembly to cool the print head and associated nozzle(s), and a heating element. A platform may be disposed below the print head. The feed mechanism holds a build material (e.g., a bulk material such as a powdered structural material, such as a polymer or metal) and distributes a layer of the build material on the platform. The printer head sprays a print agent, such as an ink or a fusing agent, with the nozzle(s) in a selected pattern across the layer of the build material previously distributed on the platform.

During 3D printing operations, the print head moves right or left parallel a first axis and may move forward or backward parallel a second axis perpendicular to the first axis to distribute or print the fusing agent on the layer of the build material at the desired locations. The heating element (e.g., a lamp) applies thermal energy to the deposited build material to cause those portions on which the fusing agent has been printed to fuse, whereas portions on which no fusing agent has been printed will not heat sufficiently to fuse. The heating element may be a lamp that moves relative to the platform, providing radiant heat, and the movement of the heating element may be synchronized with the movement of the print head. The air duct assembly of the cooling system circulates air across the print head to keep it cool and prevent excessive heating, which may cause damage to the print head, for example.

In one example in accordance with the present disclosure, an electronic device comprises a print head to move relative to a platform parallel to a first axis and parallel to a second axis to deliver a print agent to the platform. The second axis is oriented at a non-zero angle relative to the first axis. The electronic device also comprises a cooling system including a first air duct coupled to the print head and to provide air to the print head. The print head is to move with the first air duct parallel to the first axis, and to move relative to the first air duct parallel to the second axis.

In some examples, the electronic device comprises a second air duct coupled to the print head to move with the print head parallel to the first axis and the second axis. The second air duct is to deliver the air from the first air duct to the print head. The second air duct is slidably coupled to the first air duct.

In some examples, the cooling system comprises an exhaust port to exhaust the air provided to the print head by the first air duct and the second air duct. The print head is to move with the exhaust port parallel to the first axis, and to move relative to the exhaust port parallel to the second axis.

In some examples, the electronic device comprises comprising an indexing sled coupled to the print head and to move the print head. The second air duct is positioned between a surface on the print head and a surface on the indexing sled.

In some examples, the electronic device comprises a feed mechanism to distribute a layer of the build material on the platform. The print head is to deliver the print agent on a select portion of the layer of the build material. In some examples, the print agent comprises a fusing agent and the build material comprises a powdered polymer or metal.

In some examples, the electronic device comprises a heating element to apply thermal energy to the build material and the print agent on the platform to fuse the select portions of the build material on which the print agent is delivered.

In some examples, the cooling system comprises an exhaust port to exhaust the air provided to the print head by the first air duct. The print head is to move with the exhaust port parallel to the first axis and to move relative to the exhaust port parallel to the second axis.

In another example in accordance with the present disclosure, an electronic device comprises a housing. In addition, the electronic device comprises a carriage disposed within the housing to move relative to the housing parallel to a first axis. The electronic device also comprises an indexing sled disposed within the housing to move with the carriage parallel to the first axis and to move relative to the carriage parallel to a second axis. The second axis oriented at a non-zero angle relative to the first axis. Further, the electronic device comprises a print head disposed within the carriage. Still further, the electronic device comprises a cooling system including a first air duct to provide air to the print head. The print head is to move with the indexing sled parallel to the first axis and the second axis. The first air duct is to move with the carriage parallel to the first axis.

In some examples, the print head is to move with the first air duct parallel to the first axis and to move relative to the first air duct parallel to the second axis.

In some examples, the electronic device comprises a second air duct extending from the first air duct to the print head. The second air duct is defined by a surface of the print head and a surface of the indexing sled. The second air duct is slidably coupled to the first air duct. The second air duct is to move relative to the first air duct parallel to the second axis.

In some examples, the electronic device comprises an exhaust port coupled to the carriage to exhaust the air from the print head. The print head is to move with the exhaust port parallel to the first axis and to move relative to the exhaust port parallel to the second axis. In some examples, the exhaust port comprises a third air duct coupled to an exhaust fan.

In another example in accordance with the present disclosure, an electronic device comprises a print head to move relative to a platform parallel to a first axis and parallel to a second axis to deliver a print agent to the platform. The second axis oriented at a non-zero angle relative to the first axis. The electronic device also comprises a cooling system to circulate air to the print head. The cooling system includes a first air duct and a second air duct movably coupled to the first air duct, wherein the first air duct is to move with the second air duct and the print head parallel to the first axis. The second air duct is to move with the print head parallel to the second axis relative to the first air duct.

In some examples, the second air duct slidably engages the first air duct. The second air duct is to deliver the air from the first air duct to the print head.

In examples described below, the air duct assembly includes a first air duct attached to a fan and a second air duct mounted to the print head. The first air duct receives air from the fan, and the second air duct receives air from the first air duct. The second air duct cools the print head and nozzle disposed therein without the cooling air directly contacting an ejection port of the nozzle. The second air duct slidingly engages the first air duct such that the second air duct and the print head move with the first air duct parallel the first axis, but move relative to the first air duct parallel the second axis. The cooling system may include a reflective radiant barrier mounted to the print head to reduce the radiant transfer of thermal energy from the heating element to the print head. The radiant barrier moves with the print head and shields the print head from radiant energy emitted by the heating element as well as radiant energy emanating from the fused material (fused build material and fusing agent) disposed on the platform. The radiant barrier includes a through-hole to provide a passage for the print agent emitted from the nozzle to pass therethrough.

Referring now to FIG. 1, an example electronic device 100 in accordance with the principles disclosed herein is shown. In this example, electronic device 100 includes a housing 102 for which a coordinate system may be defined by an x-axis, a y-axis, and a z-axis. In this example, the three axes are orthogonal with the x-axis extending lengthwise (left and right in FIG. 1), the y-axis extending widthwise (into and out of the page in FIG. 1), and the z-axis extending vertically (up and down in FIG. 1).

Electronic device 100 includes a first print head 110A, a second print head 110B, and a cooling system 112 mounted in a pen carriage 114. Electronic device 100 also includes a material feed mechanism 116 to deposit sequential layers of build material on a vertically adjustable platform 126, a heating element 118, a guide bar 122, a bin 124, and a barrier wall 132. Pen carriage 114, feed mechanism 116, and heating element 118 are slidingly mounted to guide bar 122 to move parallel to the x-axis across bin 124 and platform 126. Pen carriage 114, feed mechanism 116, and heating element 118 may share a drive mechanism (not shown) or may each have a separate drive mechanism to move together or separately along bar 122. Device 100 may include a pair of laterally spaced guide bars disposed on opposite sides of pen carriage 114, feed mechanism 116, and heating element 118 and extending parallel to the y-axis. In some examples, pen carriage 114, feed mechanism 116, heating element 118 or combinations thereof are mounted to the pair of laterally spaced guide bars to move along the y-axis perpendicular to the x-axis. Heating element 118 is a radiant heat source such as a lamp, for example.

Platform 126 is disposed in bin 124 and can be moved along the z-axis within bin 124 by a lift mechanism 128. Thus, lift mechanism 128 may move platform 126 vertically downward along the z-axis in increments to allow platform 126 to receive sequential layers of build material and print agent. Lift mechanism 128 may move platform 126 vertically upward when preparing for the removal of a printed part or when preparing for a new print task. Bin 124 may be for customer-installation into housing 102 or removable from housing 102 to facilitate shipping, for replacement or repair, for removal of a printed part following a print operation, or for another reason.

Referring still to FIG. 1, barrier wall 132 is horizontally oriented and includes an aperture 134 through which cooling system 112 extends. Wall 132 is designed such that aperture 134 may move back-and-forth along the x-axis (right and left in FIG. 1) such that aperture 134 moves with pen carriage 114. Within housing 102, a plurality of volumetric zones may be defined for convenience. These zones may be useful for describing the locations or movement of components or air. The space between wall 132 and housing 102 opposite carriage 114 defines a first or air source zone 141. The space within carriage 114 defines a second or carriage zone 142. A third or work zone 143 is positioned within housing 102 below wall 132 and around carriage 114. Thus, carriage 114 is located in work zone 143 along with feed mechanism 116, heating element 118, and bin 124. A fourth or outside zone 144 is located outside of housing 102.

Figure 2:
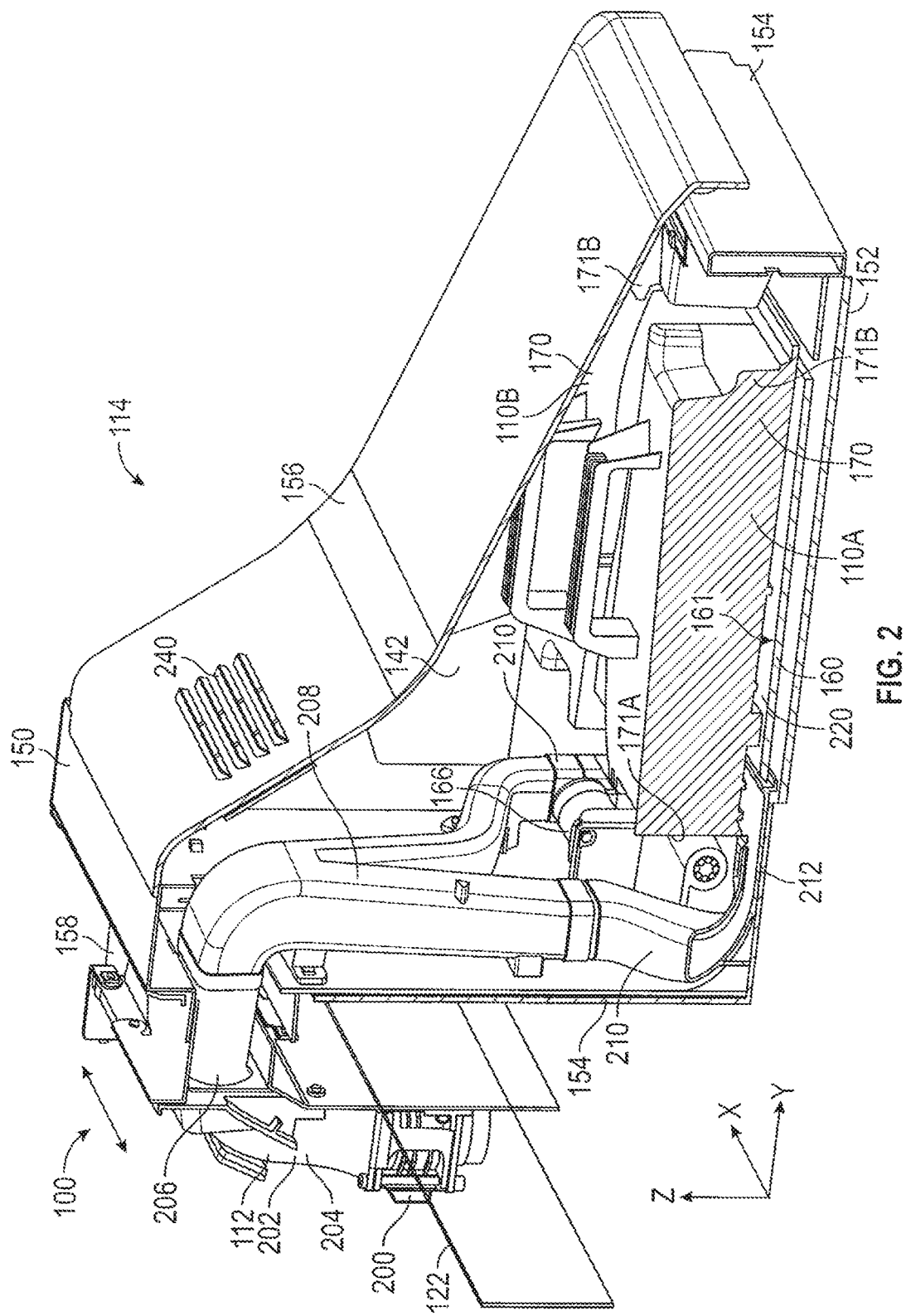
FIG. 2 shows a perspective partial cut-away view of the pen carriage of FIG. 1 in accordance with various examples.
Figure 3:
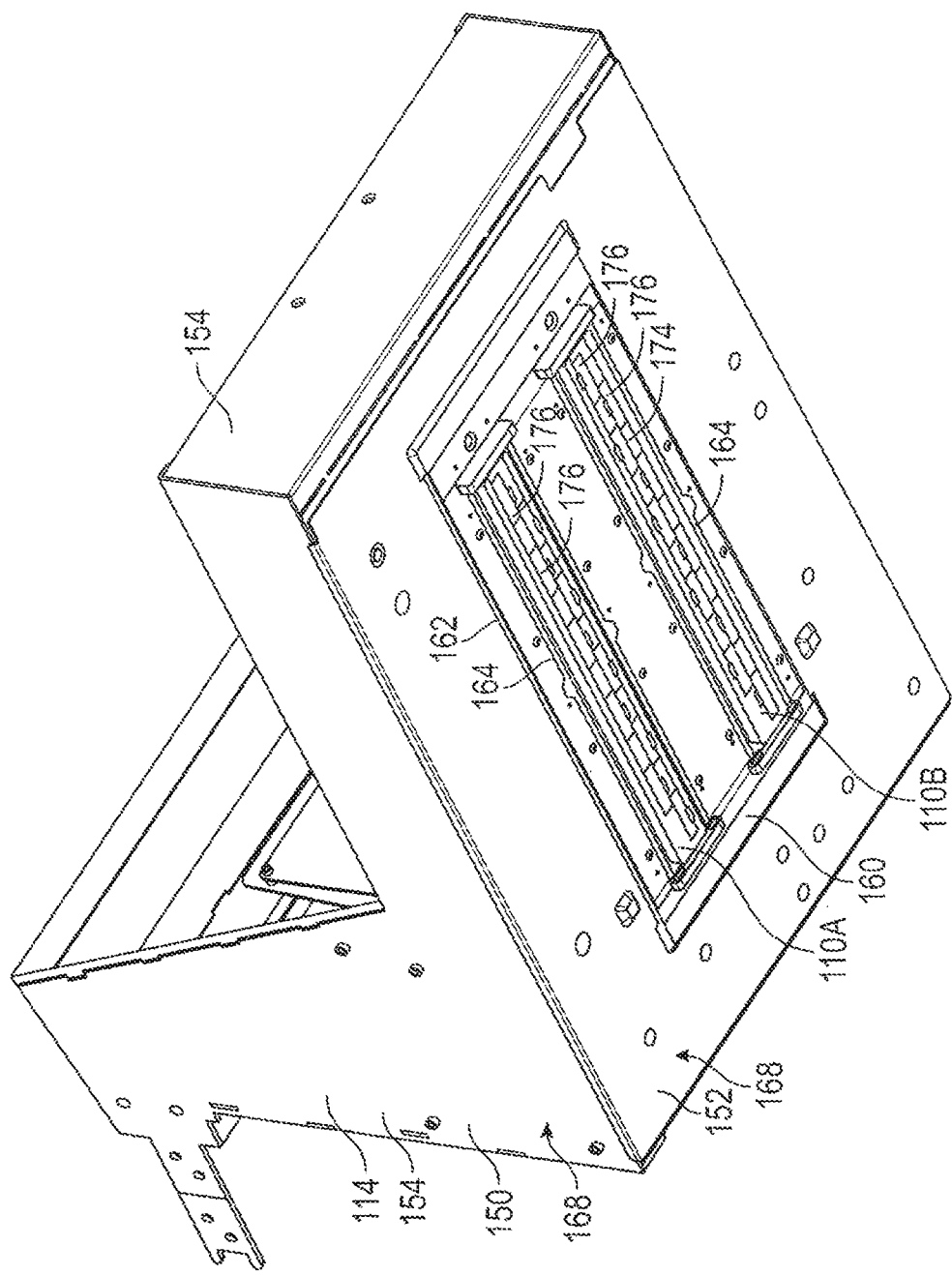
FIG. 3 shows a perspective bottom view of the pen carriage of FIG. 2 in accordance with various examples.

Referring now to FIGS. 2 and 3, pen carriage 114 is shown. In FIG. 2, guide bar 122 is shown in phantom. The orientation of the coordinate system shown in FIG. 2 is the same as in FIG. 1. Pen carriage 114 includes a housing 150 having a base plate 152, a plurality of walls 154, a cover 156, and a tunnel 158 through which cooling system 112 extends.

In FIG. 1, tunnel 158 extends through aperture 134 and may be sealingly coupled to barrier wall 132 to reduce or prevent air flow in between aperture 134 and tunnel 158. Carriage 114 also includes an indexing sled 160 mounted above an aperture 162. Print heads 110A, 110B are mounted on top of sled 160, extending through an aperture 164. Sled 160 includes an upward facing surface 161 that faces a surface on the adjacent print head 110A, 110B. Sled 160 may slide parallel to the y-axis driven by an indexing motor 166 to adjust the position of print heads 110A, 110B with respect to carriage housing 150, device housing 102, or platform 126, allowing greater control over where print heads 110A, 110B spray a print agent on platform 126. Portions of housing 150 include a reflective surface(s), which performs a radiant barrier 168 to deflect heat from lamp 118 or hot material on platform 126. As examples, the material of base plate 152, walls 154, or cover 156 may have reflective surface qualities, or a surface coating, such as a Miro-Silver® coating by Alanod® having an reflectivity of up to 98%, may be applied to portions of base plate 152, walls 154, or cover 156, sled 160, or a print head 110A, 110B. Cover 154 may extend vertically down, alongside walls 154. In some examples, radiant barrier 168 includes a separate plate(s) attached outside portions of housing 150 and sled 160, the plate(s) having a reflective surface as described.

Figure 4:
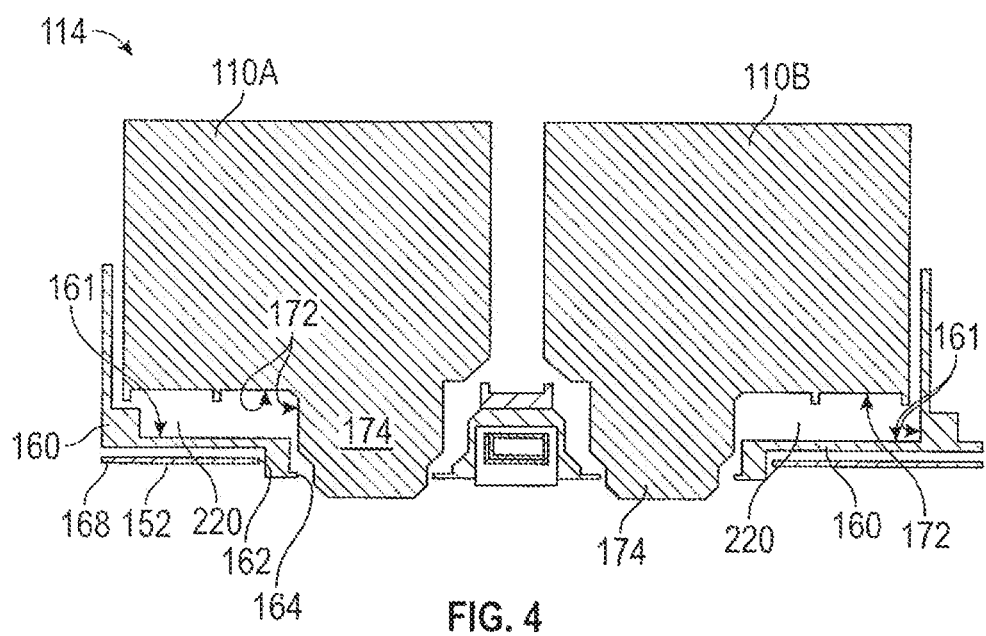
FIG. 4 shows a cross-sectional end view of the print heads mounted on the indexing sled of FIG. 2 in accordance with various examples.

Referring now to FIGS. 2-4, each print head 110A, 110B includes a body 170 extending from a first end 171A to a second end 171B. As shown in FIG. 4, first print head 110A and second print head 110B are mounted on indexing sled 160 above housing base plate 152. Each print head 110A, 1108 also includes a surface 172 to be cooled and a nozzle portion 174 in which an array of nozzles 176 are disposed (FIG. 3). Print head 110A, 110B may also be referred to as a print bar, a pen, or other name in the industry. In the present example, the surface 172 faces downward and sideways around the nozzle portion 174, and nozzles 176 face downward. Surface 172 may be thermally coupled to nozzle portion 174 and may include a material with sufficient thermal conductivity to draw heat away from nozzle portion 174 when air flows across surface 172 and nozzle portion 174 is heated beyond the temperature of the air flow. For example, surface 172 may be made of aluminum, copper, sheet metal, or cast iron.

First print head 110A is coupled to a source of a first print agent or agents that may include, without limitation, an ink of a first color, multiple inks having multiple colors, a fusing agent, a detailing agent, or combinations thereof. Second print head 110B is coupled to a source of a second print agent or agents that may include, without limitation, an ink of a second color, multiple inks having multiple colors, a fusing agent, and a detailing agent.

Referring again to FIG. 2, cooling system 112 includes an inlet fan 200, a first air conduit or duct 202 coupled to fan 200, a second air conduit or duct 220 moveably coupled to inlet duct 202, and an exhaust port 240. Inlet duct 202 is fixably coupled to housing 150, and thus, moves with housing 150 parallel to the x-axis. In this example, and moving from fan 200 to second duct 220, first duct 202 includes an inlet portion 204, a neck portion 206, a y-member or splitter 208, and a pair of transition elbows 210. Inlet portion 204 extends vertically upward from fan 200 and transitions to the horizontal neck portion 206, which extends through tunnel 158 of carriage housing 150. Neck portion 206 transitions to splitter 208, which divides the flow path, defined by portions 204, 206, into two flow paths. The outlet of each flow path defined by splitter 208 terminates at a corresponding transition elbow 210, which extends to a horizontal discharge end 212.

Figure 5:
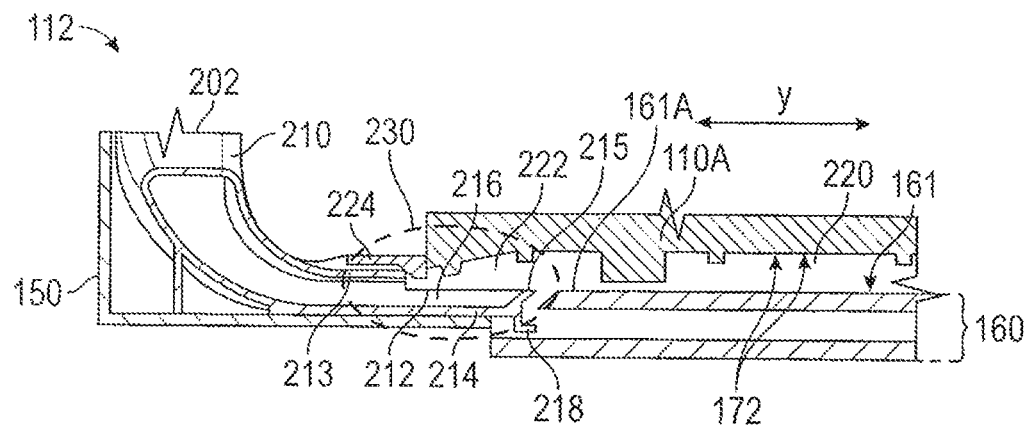
FIG. 5 shows an enlarged side view of a portion of the cooling system of FIG. 2 in a first configuration in accordance with various examples.

Referring briefly to FIG. 5, discharge end 212 includes a lower wall 214 and an upper wall 213. Lower wall 214 extends horizontally beyond upper wall 213 and curves upwardly to terminate at a lip 215. As a result, an upward facing exit port 216 is formed at discharge end 212. A boss 218 extends downward from lip 215.

Referring again to FIG. 4, second air duct 220 is positioned between and defined by a downward facing surface 172 of print head 110A, 110B and an upward facing surface 161 on indexing sled 160. Thus, in this example, duct 220 is formed, at least in part, by print head 110A, 110B and indexing sled 160 for direct heat exchange between a supplied air flow and print head 110A, 110B.

Referring again to FIG. 5, air duct 220 includes a downward facing inlet port 222 immediately over and in fluid communication with exit port 216. Inlet port 222 includes a horizontal plate 224 vertically above and spaced apart from a proximal end 161A of surface 161 on indexing sled 160. Plate 224 rests above and slidingly engages upper wall 213 of first air duct 202. Thus, a slidable coupling 230 is formed between air ducts 202, 220 at exit port 216 and inlet port 222. In FIG. 5, coupling 230 couples first air duct 202 to the print head 110A to deliver air to the print head 110A for cooling. Exhaust port 240 includes an air filter and a louvered baffle mounted to an aperture in cover 156 of housing 150. While the discussions of FIG. 5, here, and FIG. 6, below, may be directed to print head 110A, relationships and movements that are described also pertain to print head 110B.

Referring now to FIGS. 1 and 2, a path for a supplied air flow extends from air source zone 141, into fan 200 and through inlet air duct 202 to splitter 208, which divides the air flow into two separate air paths. Each air path of splitter 208 passes through a corresponding transition elbow 210 into a corresponding second air duct 220 coupling 230. The air path continues through second duct 220 beneath the corresponding print head 110A, 110B and exits second duct 220 proximal second end 171B of print head 110A, 110B and into zone 142 within carriage 114. The air exiting second ducts 220 rejoins in zone 142 and ultimately exits carriage 114 at exhaust port 240.

Figure 6:
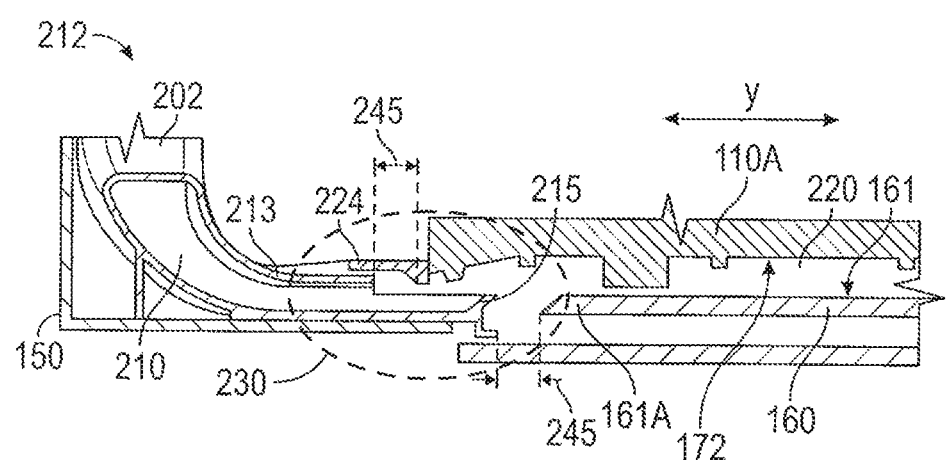
FIG. 6 shows an enlarged side view of the portion of the cooling system of FIG. 5 in a second configuration in accordance with various examples.

As shown in FIGS. 5 and 6, sled 160 may move back and forth parallel to the y-axis, print head 110A and second duct 220 move with sled 160 parallel to the y-axis. In FIG. 5, sled 160 is in a rearward position relative to first duct 202 and housing 150 with slidable coupling 230 in a retracted configuration with proximal end 161A of surface 161 immediately adjacent lip 215. In FIG. 6, sled 160 is in a forward position relative to duct 210 and housing 150 with slidable coupling 230 in an extended configuration. Proximal end 161A of sled 160 is displaced by a horizontal separation distance 245 from lip 215 of duct 210 with coupling 230 in the extended configuration (FIG. 6). Similarly, plate 224 of sled 160 is displaced by the same horizontal distance 245 along upper wall 213 of duct 202. Plate 224 and wall 213 slidingly engage and overlap during movement of second duct 220 and sled 160 relative to first duct 202 to reduce leakage of air flow. In addition, the upwardly extending lip 215 continues to direct the supplied air flow from first duct 202 into inlet port 222 of second duct 220.

Sled 160 may be moved back and forth parallel to the y-axis within carriage 114 between the rearward position of FIG. 5 and the forward position FIG. 6 to adjust the targeted locations for ejection of the print agent from the nozzles 176. Slidable coupling 230 facilitates fluid communication for a supplied air flow between ducts 202, 220 while sled 160 and duct 220 move with sled 160 relative to duct 202. Print heads 110A, 110B and second air ducts 220 move with the first air duct 202 parallel to the x-axis, but move relative to the first air duct 202 parallel to the y-axis. In this example, both print heads 110A, 110B move together with sled 160.

Figure 7:
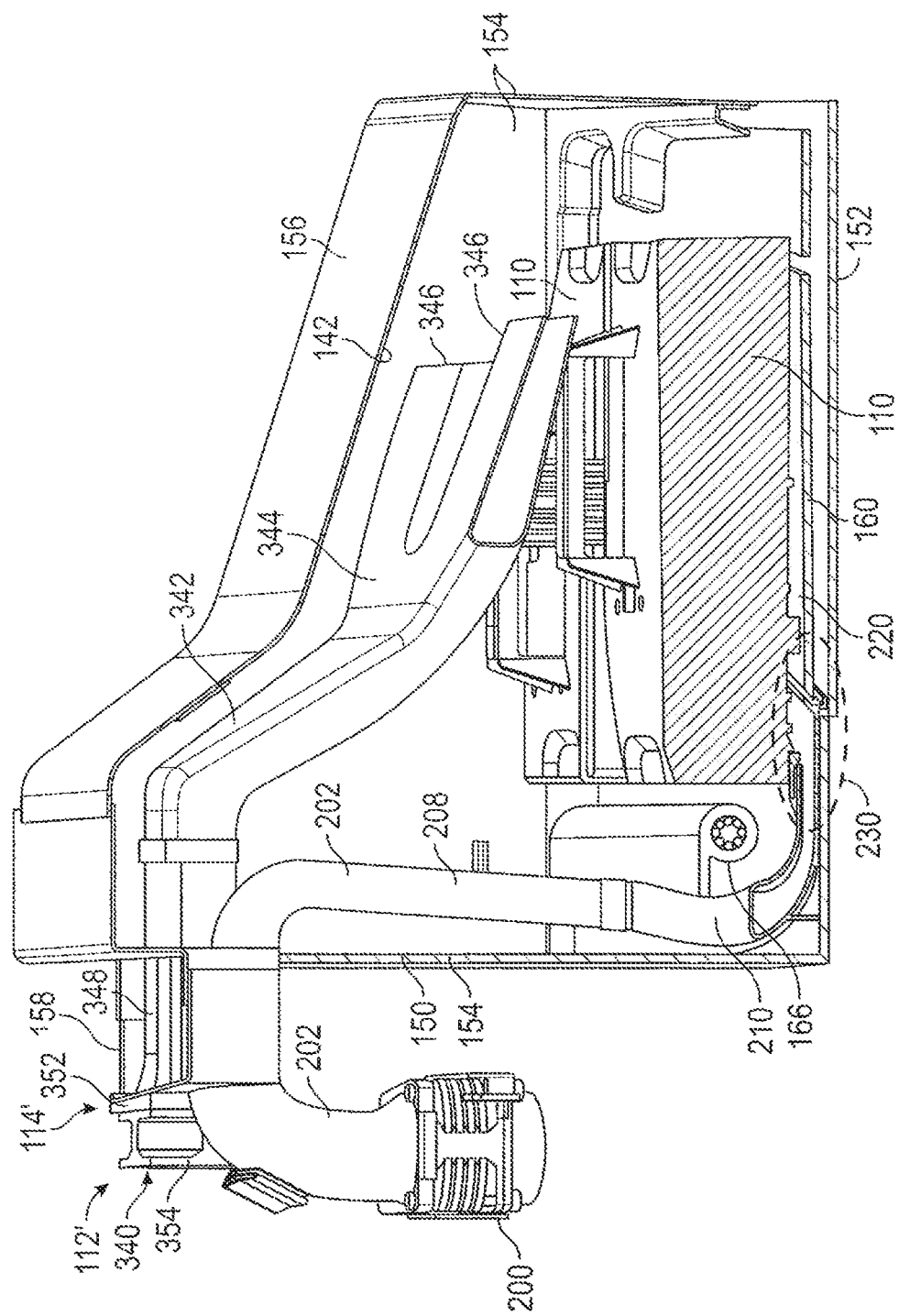
FIG. 7 shows a perspective partial cut-away view of a pen carriage having a cooling system in accordance with various examples.

Referring now to FIG. 7, another example of a pen carriage 114' is shown. Pen carriage 114' may be installed and operated in electronic device 100 in place of pen carriage 114. A first and a second print head 110A, 110B as previously described and a cooling system 112' are mounted in carriage 114'. Pen carriage 114' is substantially the same as carriage 114 previously described with the exception that exhaust port 240 (FIG. 2) is replaced by an exhaust port 340. In this example, exhaust port 340 includes an outlet air duct 342 and an exhaust fan 354. Thus, carriage 114' includes a housing 150 and an indexing sled 160. Housing 150 includes a base plate 152, walls 154, a cover 156, and a tunnel 158, each as previously described. However, in this example, cover 156 lacks an aperture for an exhaust port. The structure and function of sled 160, print heads 110A, 110B, and the mounting and movement of sled 160 with respect to base place 152 are as previously described. For example, sled 160 moves parallel to the y-axis with respect to housing 150.

Similar to cooling system 112 previously described (FIG. 2), in this example, cooling system 112' includes an inlet fan 200 located exterior to housing 150, an inlet air duct 202 coupled to fan 200, a splitter 208, a pair of transition elbows 210, and a pair of second air ducts 220 as previously described. However, unlike cooling system 112, exhaust port 340 of cooling system 112' includes outlet air duct 342 and exhaust fan 354. Duct 342 includes a splitter 344 and a neck portion 348. Splitter 344 includes two inlet ports 346 in zone 142 within housing 150. The passages extending from ports 346 merge along splitter 344. The outlet end of splitter 344 is coupled to neck portion 348, which extends through housing tunnel 158 and connects to fan 354 at an exit end 352. Fan 354 draws air out from carriage zone 142 through duct 342.

In examples with carriage 114' installed in system 100, fans 200, 354 may be located in air source zone 141 and separated from work zone 143. Duct 342 and fan 354 are fixably coupled to housing 150, and thus, move with housing 150 parallel to the x-axis. Outlet air duct 342 extends through tunnel 158 and fan 354 draws air into zone 142, rather than exhausting air into work zone 143.

The above discussion is meant to be illustrative of the principles and various examples of the present disclosure. Numerous variations and modifications to the examples described above are possible. The following claims should be interpreted to embrace all such variations and modifications. For example, although various examples of the electronic devices disclosed were described in the context of a 3D printer, the cooling systems disclose herein may be implemented in other types of 3D printers, other types of printers, or other types of electronic devices.

What is claimed is:

1. An electronic device comprising:
   a print head to move relative to a platform parallel to a first axis to deliver a print agent to the platform, and
   a cooling system including a first air duct coupled to the print head and to provide air to the print head,
   wherein the print head is to move with the first air duct parallel to the first axis, and to move relative to the first air duct parallel to a second axis, the second axis oriented at a non-zero angle relative to the first axis.

2. The electronic device of claim 1 comprising a second air duct coupled to the print head to move with the print head parallel to the first axis and the second axis, wherein the second air duct is to deliver the air from the first air duct to the print head, and wherein the second air duct is slidably coupled to the first air duct.

3. The electronic device of claim 2, wherein the cooling system comprises an exhaust port to exhaust the air provided to the print head by the first air duct and the second air duct, and
   wherein the print head is to move with the exhaust port parallel to the first axis, and to move relative to the exhaust port parallel to the second axis.

4. The electronic device of claim 2 comprising an indexing sled coupled to the print head and to move the print head,
   wherein the second air duct is positioned between a surface on the print head and a surface on the indexing sled.

5. The electronic device of claim 1 comprising a feed mechanism to distribute a layer of the build material on the platform,
   wherein the print head is to deliver the print agent on a select portion of the layer of the build material.

6. The electronic device of claim 5, wherein the print agent comprises a fusing agent,
   wherein the build material comprises a powdered polymer or metal.

7. The electronic device of claim 6 comprising a heating element to apply thermal energy to the build material and the print agent on the platform to fuse the select portions of the build material on which the print agent is delivered.

8. The electronic device of claim 1, wherein the cooling system comprises an exhaust port to exhaust the air provided to the print head by the first air duct, and wherein the print head is to move with the exhaust port parallel to the first axis and the second axis.

9. An electronic device comprising:
   a housing;
   a carriage disposed within the housing to move relative to the housing parallel to a first axis;
   an indexing sled disposed within the housing to move with the carriage parallel to the first axis and to move relative to the carriage parallel to a second axis, the second axis oriented at a non-zero angle relative to the first axis;
   a print head disposed within the carriage; and
   a cooling system including a first air duct to provide air to the print head,
   wherein the print head is to move with the indexing sled parallel to the first axis and the second axis, and
   wherein the first air duct is to move with the carriage parallel to the first axis.

10. The electronic device of claim 9, wherein the print head is to move with the first air duct parallel to the first axis and to move relative to the first air duct parallel to the second axis.

11. The electronic device of claim 9 comprising a second air duct extending from the first air duct to the print head, wherein the second air duct is defined by a surface of the print head and a surface of the indexing sled,
   wherein the second air duct is slidably coupled to the first air duct, and
   wherein the second air duct is to move relative to the first air duct parallel to the second axis.

12. The electronic device of claim 11 comprising an exhaust port coupled to the carriage to exhaust the air from the print head, and wherein the print head is to move with the exhaust port parallel to the first axis and the second axis.

13. The electronic device of claim 12, wherein the exhaust port comprises a third air duct coupled to an exhaust fan.

14. An electronic device comprising:
 a print head to move relative to a platform parallel to a first axis and parallel to a second axis to deliver a print agent to the platform, the second axis oriented at a non-zero angle relative to the first axis; and
 a cooling system to circulate air to the print head, wherein the cooling system includes a first air duct and a second air duct movably coupled to the first air duct, wherein the first air duct is to move with the second air duct and the print head parallel to the first axis, and wherein the second air duct is to move with the print head parallel to the second axis relative to the first air duct.

15. The electronic device of claim 14, wherein the second air duct slidably engages the first air duct, and wherein the second air duct is to deliver the air from the first air duct to the print head.

* * * * *